United States Patent [19]

Benguerel

[11] 4,323,498
[45] Apr. 6, 1982

[54] CARBOCYCLIC DISAZO COMPOUNDS CONTAINING A 2-AMINO-8-HYDROXY-5- OR 6-SULFO-NAPHTHALENE-2 COUPLING COMPONENT RADICAL

[75] Inventor: Francois Benguerel, Oberwil, Switzerland

[73] Assignee: Sandoz Ltd., Basel, Switzerland

[21] Appl. No.: 2,226

[22] Filed: Jan. 9, 1979

Related U.S. Application Data

[63] Continuation-in-part of Ser. No. 818,008, Jul. 22, 1977, abandoned.

[30] Foreign Application Priority Data

Jul. 28, 1976 [CH]  Switzerland ................ 9638/76
Dec. 15, 1978 [CH]  Switzerland ................ 12787/78

[51] Int. Cl.³ ................ C09B 31/04; C09B 29/04
[52] U.S. Cl. ................ 260/187; 260/197;
260/184; 260/186; 260/189; 260/190; 260/191; 260/194; 260/196; 260/207.1
[58] Field of Search ............. 260/191, 186, 189, 190, 260/187

[56] References Cited

U.S. PATENT DOCUMENTS

1,378,388  5/1921  Susemihl ................ 260/191
4,066,388  1/1978  Botros ................ 260/191 X
4,143,035  3/1979  Stingl ................ 260/191

FOREIGN PATENT DOCUMENTS

229303  12/1908  Fed. Rep. of Germany ...... 260/191
695401  8/1940  Fed. Rep. of Germany ...... 260/191
821981  11/1951  Fed. Rep. of Germany ...... 260/190
2453209  5/1976  Fed. Rep. of Germany ...... 260/191

OTHER PUBLICATIONS

Zollinger, "Azo and Diazo Chemistry, Aliphatic and Aromatic Compounds", pp. 260 to 265, (1961).

Primary Examiner—John Doll
Attorney, Agent, or Firm—Gerald D. Sharkin; Richard E. Vila; Melvyn M. Kassenoff

[57] ABSTRACT

Compounds of the formula

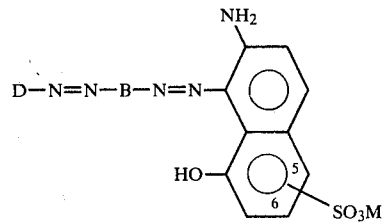

in which D is

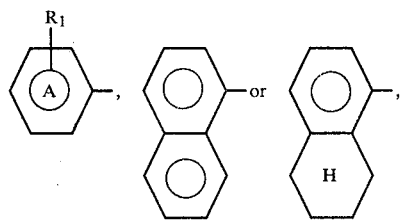

in which
R₁ is trifluoromethyl, —COOM₁' —COOR₂; or a group of the formula or —NHR₃, —NR₃R₄ or —NR₅COR₆ in a position meta or para to the azo group, ring A being optionally further substituted by a total of up to two further substituents selected from halogen, (C₁₋₄)alkyl, (C₁₋₄)alkoxy and trifluoromethyl (only one further trifluoromethyl group),
R₂ is (C₁₋₁₂)alkyl,
each of R₃ and R₄, independently, is (C₁₋₆)alkyl,
R₅ is hydrogen or (C₁₋₄)alkyl,
R₆ is (C₁₋₆)alkyl, (C₁₋₆)alkoxy or (C₁₋₆)alkyl monosubstituted by chlorine or methoxy,
B is a divalent radical of the 1,4-phenylene, 1,4-naphthylene or 1,2,3,4-tetrahydronaphthylene-5,8 series, and
each of M and M₁, independently, is hydrogen or an equivalent of a non-chromophoric cation, with the proviso that the molecule contains a single —SO₃M group which is in the 5- or 6-position, and mixtures thereof, which compounds and mixtures are useful as anionic dyestuffs for substrates such as natural and synthetic polyamides, polyolefins modified to contain basic groups, polyurethanes and leather. They are well-soluble in water, exhaust from a neutral dyebath, build-up well and yield intense, even dyeings possessing notable fastness to washing, sweat, rubbing and light.

41 Claims, No Drawings

CARBOCYCLIC DISAZO COMPOUNDS CONTAINING A 2-AMINO-8-HYDROXY-5- OR 6-SULFO-NAPHTHALENE-2 COUPLING COMPONENT RADICAL

This application is a continuation-in-part of application Ser. No. 818,008, filed July 22, 1977 and now abandoned.

The present invention relates to azo compounds and mixtures thereof, their production and use.

Accordingly, the present invention provides azo compounds of formula I,

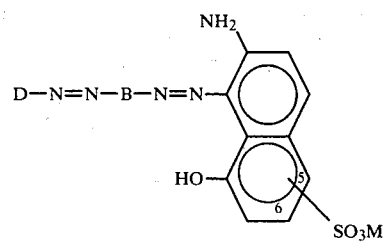

in which D is a diazo component radical of formula (a), (b) or (c),

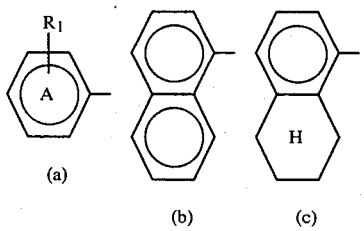

in which $R_1$ is trifluoromethyl, —$COOM_1$ or —$COOR_2$; or a group of the formula —$NHR_3$, —$NR_3R_4$ or —$NR_5COR_6$ in a position meta or para to the azo group, ring A being optionally further substituted by a total of up to two further substituents selected from halogen, ($C_{1-4}$)alkyl (preferably methyl), ($C_{1-4}$)alkoxy (preferably methoxy) and trifluoromethyl (only one further trifluoromethyl group), $R_2$ is ($C_{1-12}$)alkyl, each of $R_3$ and $R_4$, independently, is ($C_{1-6}$)alkyl, $R_5$ is hydrogen or ($C_{1-4}$)alkyl, $R_6$ is ($C_{1-6}$)alkyl, ($C_{1-6}$)alkoxy or ($C_{1-6}$)alkyl monosubstituted by chlorine or methoxy, B is a divalent radical of the 1,4-phenylene, 1,4-naphthylene or 1,2,3,4-tetrahydronaphthylene-5,8 series, and each of M and $M_1$, independently, is hydrogen or an equivalent of a non-chromophoric cation, with the proviso that the molecule contains a single —$SO_3M$ group which is in the 5- or 6-position, and mixtures thereof, which compounds and mixtures are useful as anionic dyestuffs.

The alkyl radicals as $R_2$, $R_3$, $R_4$, $R_5$ and $R_6$ may be straight- or branched-chain.

$R_2$ is preferably ($C_{1-8}$)alkyl. More preferably, $R_2$ is $R_2'$, where $R_2'$ is ($C_{1-4}$)alkyl.

Each of $R_3$ and $R_4$, independently, is preferably ($C_{1-4}$)alkyl; more preferably, $R_3$ and $R_4$ are $R_3'$ and $R_4'$, respectively, where each of $R_3'$ and $R_4'$, independently, is methyl or ethyl, especially methyl.

Any alkyl as $R_5$ is preferably methyl. Preferably, $R_5$ is $R_5'$, where $R_5'$ is hydrogen or methyl, especially hydrogen.

Any unsubstituted alkyl as $R_6$ is preferably ($C_{1-4}$)alkyl, more preferably methyl or ethyl, especially methyl. Any substituted alkyl as $R_6$ is preferably ω-chloro- or methoxy-substituted ($C_{1-3}$)alkyl. Any alkoxy group as $R_6$ is preferably ($C_{1-4}$)alkoxy, with methoxy being most preferred.

$R_6$ is preferably $R_6'$, where $R_6'$ is ($C_{1-4}$)alkyl, ω-chloro- or methoxy-substituted ($C_{1-3}$)alkyl or —($C_{1-4}$)alkoxy. More preferably $R_6$ is $R_6''$, where $R_6''$ is methyl, ethyl, methoxy, 2-methoxyethyl or 3-methoxypropyl. Most preferably, $R_6$ is $R_6'''$, where $R_6'''$ is methyl or methoxy, with methyl being especially preferred.

$R_1$ is preferably $R_1'$, where $R_1'$ is trifluoromethyl, —$COOR_2'$, —$NHR_3'$, —$NR_3'R_4'$ or —$NR_5'COR_6'$. More preferably $R_1$ is $R_1''$, where $R_1''$ is —$COOR_2'$ or —$NR_5'COR_6''$. Most preferably, $R_1$ is $R_1'''$, where $R_1'''$ is —$NR_5'COR_6'''$, with —$NHCOCH_3$ being especially preferred.

Preferably any halogen on ring A is chlorine or bromine, with chlorine being most preferred.

Ring A is preferably further unsubstituted or further substituted by a total of up to two substituents selected from chlorine, methyl and methoxy.

Where ring A bears one substituent in addition to $R_1$, the two substituents are preferably in the 2,4-, 2,5- or 3,4-positions, with the 3,4-positions being especially preferred.

Where ring A bears two substituents in addition to $R_1$, the three substituents are preferably in the 2,3,5-, 2,4,5- or 2,4,6-positions, with the 2,4,5- and 2,4,6-positions being most preferred.

Preferably the group (a) is ($a_1$),

wherein ring A is further unsubstituted or further substituted by a total of up to two substituents selected from the group consisting of halogen, ($C_{1-4}$)alkyl, ($C_{1-4}$) alkoxy and trifluoromethyl (only one trifluoromethyl), with chlorine, methyl and methoxy being especially preferred. More preferably $R_1$ is $R_1''$.

More preferably (a) is ($a_2$),

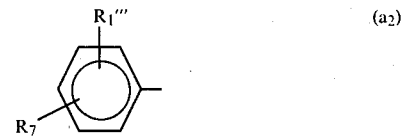

wherein $R_7$ is hydrogen, chlorine, methyl or methoxy, especially hydrogen. In ($a_2$) most preferably $R_7$ is hydrogen and $R_1'''$ is —$NHCOCH_3$, such group being designated as ($a_3$) hereinafter.

D is preferably ($a_1$) or (b), more preferably ($a_2$), with the group ($a_3$) being most preferred.

B is preferably 1,4-naphthylene, 1,2,3,4-tetrahydronaphthylene-5,8 or a group of formula (d),

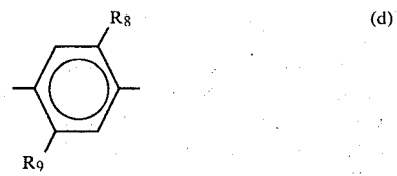

in which each of $R_8$ and $R_9$, independently, is hydrogen, $(C_{1-4})$alkyl or $(C_{1-4})$alkoxy.

Any alkyl as $R_8$ and/or $R_9$ is preferably methyl or ethyl, most preferably methyl.

Any alkoxy as $R_8$ and/or $R_9$ is preferably methoxy or ethoxy, most preferably methoxy.

$R_8$ is preferably $R_8'$, where $R_8'$ is methyl, methoxy or ethoxy, most preferably methoxy.

$R_9$ is preferably $R_9'$, where $R_9'$ is hydrogen, methyl, methoxy or ethoxy. Most preferably $R_9$ is $R_9''$, where $R_9''$ is methyl or methoxy.

Preferably, the group (d) is $(d_1)$, where $(d_1)$ is a group of formula (d) where $R_8$ is $R_8'$ and $R_9$ is $R_9'$. More preferably (d) is $(d_2)$, where $(d_2)$ is (d) wherein $R_8$ is methoxy and $R_9$ is $R_9''$, preferably methoxy.

B is preferably 1,4-naphthylene or a group of formula (d), with (d) being especially preferred. More preferably, B is a group of formula $(d_1)$, most preferably $(d_2)$.

Preferred compounds of formula I are those in which D is a group of formula (a) or (b) and B is a group of formula (d) or 1,4-naphthylene.

More preferred compounds of formula I are those where D is a group of formula $(a_1)$ (preferably where $R_1$ is $R_1''$) and B is $(d_1)$ or is 1,4-naphthylene; of these, those compounds where D is a group of formula $(a_2)$ and the sulpho group on the naphthalene nucleus is in the 6-position are even more preferred. Most preferred compounds are those wherein D is $(a_3)$, B is $(d_2)$ and the sulpho group is in the 6-position.

Further preferred compounds of Formula I and mixtures thereof are those of Formula Ix

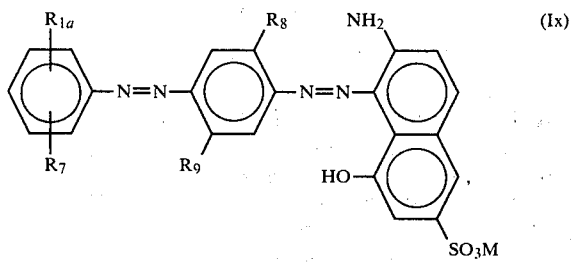

wherein $R_{1a}$ is —$CF_3$, —$COOR_2'$ or m— or p—$NR_5'COR_6'$.

In Formula Ix: $R_{1a}$ is preferably —$COOR_2'$ or m— or p—$NR_5'COR_6'$, wherein $R_6'$ is preferably $(C_{1-4})$alkyl or $(C_{1-4})$alkoxy. More preferably, $R_{1a}$ is m— or p—$NR_5'COR_6'$, wherein $R_6'$ is preferably $(C_{1-4})$alkyl or $(C_{1-4})$alkoxy, more preferably $(C_{1-4})$alkyl. Even more preferably $R_{1a}$ is m— or p—$NHCOR_6'$. $R_6'$ is preferably $(C_{1-4})$alkyl. $R_7$ is preferably hydrogen. $R_8$ is preferably $R_8'$ and $R_9$ is preferably hydrogen, methyl or methoxy, with methoxy being the most preferred significance of $R_8'$. The —$SO_3M$ group is preferably in the 6-position of the naphthalene ring.

The non-chromophoric cations as M and $M_1$, independently, may be any one of those common in the chemistry of anionic dyestuffs. Preferably each M and $M_1$, independently, is hydrogen, an alkali metal cation, such as lithium, sodium or potassium, an unsubstituted, lower alkyl substituted- or a hydroxyalkyl substituted-ammonium ion of the formula $N^{\oplus}(R_{10})_4$ in which each $R_{10}$, independently, is hydrogen, $(C_{1-3})$alkyl or 2- 3- or 4-hydroxy$(C_{2-4})$alkyl. Examples of such ammonium ions are ammonium, triethylammonium, mono-, di-, tri- and tetramethylammonium, mono-, di- and triethanolammonium and mono-, di- or triisopropanolammonium. Preferably M and $M_1$ are identical. Alkali metal cations are the preferred cations. M and $M_1$ are, therefore, preferably hydrogen or an alkali metal cation and the same.

It will be appreciated that the substituted ammonium cation should not contain groups which would cause stability or steric problems, for example tetraalkanolammonium.

The present invention further provides a process for the production of compounds of formula I and mixtures thereof comprising coupling the diazo derivative of an amine of formula II, $$D—N=N—B—NH_2 \qquad \text{II}$$

or a mixture thereof with a compound of formula III,

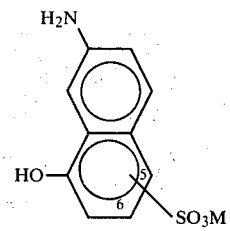

in which the —$SO_3M$ group is in the 5- or 6-position, or a mixture thereof.

The coupling reaction is carried out in acid medium, preferably at a pH of from 3 to 4.5, in accordance with conventional methods.

Diazotization of the compound of formula II may be carried out in accordance with known methods.

The compounds of formula II are either known or may be prepared in accordance with known methods by coupling the diazo derivative of an amine of the group D—$NH_2$ with a compound of the formula B—$NH_2$ in acid medium.

The compounds of formula III are known.

In general, as a result of the process of production, the compounds of formula I are obtained in salt form, usually in the sodium or potassium salt form, and may be isolated as such from the reaction mixture in accordance with known methods. However, they may also be isolated in the form of free acids by adding acid to the reaction mixture. The compounds may be employed for dyeing as such or may be converted into the salt form by the addition of bases such as hydroxides, carbonates, bicarbonates, acetates, etc.

The compounds of formula I and mixtures thereof, in free acid or salt form, are useful for dyeing or printing anionic dyeable substrates. Examples of suitable substrates are natural and synthetic polyamide fibres, basic modified polyolefins, polyurethanes and leather. Preferred substrates are fibres of natural and synthetic polyamides such as wool, silk and especially nylon.

Dyeing may be carried out in accordance with known methods, especially in accordance with pad dyeing or preferably exhaust dyeing methods. The dyestuffs of formula I and mixtures thereof exhaust from a neutral dyebath.

The dyestuffs according to the present invention are well soluble in water and build up well and may be used for dyeing stripy nylon. The dyeings possess notable wet fastness, for example fastness to water, wash fastness and alkaline sweat fastness, rubbing fastness and light fastness. Further, the dyestuffs exhibit resistance to the action of sulphur and formaldehyde. The dyestuffs according to the present invention combine well with other neutral-exhausting dyestuffs, the advantages such as build-up and fastnesses being retained.

The dyestuffs according to the present invention may be employed as such or may be used in the form of liquid or solid preparations. The liquid and solid preparations may be formed in accordance with conventional methods, for example by dissolving in suitable solvents, optionally with the addition of conventional additives such as stabilizers and/or dissolving agents, for example urea, with subsequent grinding or granulating. Such preparations may be obtained in accordance with the procedure described in French Pat. Nos. 1,572,630 and 1,581,900.

Further, the mixtures according to the present invention may be made up into preparations which are dispersable in cold water. For the preparation of such dispersions the dye mixture may be ground wet or dry to a particle size of less than 20μ, preferably 1–5μ, in the presence of one or more conventional anionic dispersing agents and optionally in the presence of a non-ionic dispersing agent, with or without subsequent spray drying. The preparations so obtained are finely dispersed in cold water and are thus easy to handle.

The following Examples further serve to illustrate the invention. In the Examples all parts are by weight and all temperatures are in degrees Centigrade.

EXAMPLE 1

15 parts of 4-aminoacetanilide are diazotised with 24 parts of concentrated hydrochloric acid and 7.0 parts of sodium nitrite in conventional manner. The excess nitrite is decomposed with amidosulphonic acid. 15.3 parts of 1-amino-2,5-dimethoxybenzene are entered into 80 parts of water at 60°, then dissolved by adding 10 parts of concentrated hydrochloric acid and cooled to 0°–4° with ice. The above solution of the diazotised 4-aminoacetanilide is added to this solution over the course of half an hour. The pH is kept at 3.0 to 3.5 by the addition of sodium acetate. Stirring takes place for 2 hours at 0°–4°, and then stirring is continued for a further 16 hours at room temperature. The precipitated dyestuff is filtered and washed with a 5% hydrochloric acid solution.

The paste of the aminomonoazo dyestuff is dissolved at 80° with 70 parts water and 120 parts of glacial acetic acid and then 20 parts of concentrated hydrochloric acid are added and the temperature is set at 0°–4° by adding ice. An aqueous solution of 8.0 parts of sodium nitrite is passed in and stirred for 2 hours; the excess nitrite is subsequently decomposed with amidosulphonic acid. 23.9 Parts of 2-amino-8-hydroxynaphthalene-6-sulphonic acid are stirred with 100 parts of water and dissolved by adding about 12 parts of 30% caustic soda. This solution is added over the course of one hour to the above diazomonoazo solution, whereby the pH is kept at 3.5–4.0, by adding sodium acetate. The reaction mixture is stirred for a further 16 hours at 0°, then set at a pH of 8.5 with caustic soda and stirred at room temperature for 2 hours. The precipitated dyestuff is filtered at this temperature, washed to neutral with a 5% sodium chloride solution and dried. It corresponds to the formula

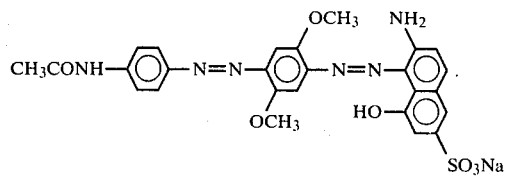

and dyes natural and synthetic polyamide fibres in dark blue shades. The dyeings have notable wet and light fastness. The corresponding compounds wherein the sodium cation is replaced by another M may also be obtained.

Further compounds of formula Ia which may be produced in analogous manner to the above procedure are given in Table 1.

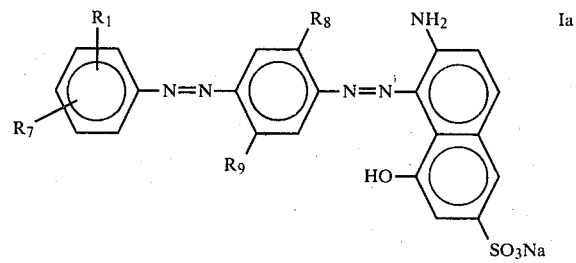

The dyestuffs of Examples 2–5, 7, 8 and 10–35 give dyeings of dark blue shades on polyamide fibre, and the dyestuffs of Examples 6 and 9 give dyeings of violet shades. The dyeings obtained have comparable properties with the dyeings obtained with the dyestuff of Example 1. The corresponding compounds wherein the sodium cation is replaced by another M may also be obtained.

TABLE 1

| Example No. | $R_1$ (position) | $R_7$ (position) | $R_8$ | $R_9$ |
|---|---|---|---|---|
| 2 | NHCOOCH$_3$ (4) | H | OCH$_3$ | CH$_3$ |
| 3 | NHCOOCH$_3$ (3) | H | " | " |
| 4 | " | H | " | OCH$_3$ |
| 5 | NHCOCH$_3$ (4) | H | " | CH$_3$ |
| 6 | " | H | CH$_3$ | " |
| 7 | NHCOCH$_3$ (3) | H | OCH$_3$ | OCH$_3$ |
| 8 | " | H | " | CH$_3$ |
| 9 | " | H | CH$_3$ | " |
| 10 | " | H | OCH$_3$ | H |
| 11 | " | CH$_3$ (4) | " | OCH$_3$ |
| 12 | " | Cl (4) | " | " |
| 13 | N(CH$_3$)COCH$_3$ (4) | H | " | " |
| 14 | N(CH$_3$)COCH$_3$ (3) | H | " | " |
| 15 | NHCOCH$_2$Cl (4) | H | " | CH$_3$ |
| 16 | " | H | " | OCH$_3$ |
| 17 | NHCOCH$_2$Cl (3) | H | " | " |
| 18 | COC$_2$H$_5$ (2) | H | " | " |
| 19 | COC$_2$H$_5$ (4) | H | " | " |
| 20 | COO—n-C$_4$H$_9$ (4) | H | " | H |
| 21 | CF$_3$ (3) | H | " | OCH$_3$ |
| 22 | CF$_3$ (2) | Cl (5) | " | CH$_3$ |
| 23 | NHCOOC$_2$H$_5$ (3) | H | " | H |
| 24 | NHCOOC$_2$H$_5$ (4) | H | " | OCH$_3$ |
| 25 | NHCOC$_2$H$_5$ (4) | H | OCH$_3$ | CH$_3$ |
| 26 | NHCOC$_2$H$_5$ (3) | H | " | " |

TABLE 1-continued

| Example No. | $R_1$ (position) | $R_7$ (position) | $R_8$ | $R_9$ |
|---|---|---|---|---|
| 27 | COO—n-$C_4H_9$ (4) | H | " | $OCH_3$ |
| 28 | $NHCOOCH_2CH_2OCH_3$ (4) | H | " | $CH_3$ |
| 29 | $NHCOOCH_2CH_2OCH_3$ (3) | H | " | H |
| 30 | $NHCOO(CH_2)_3OCH_3$ (4) | H | H | H |
| 31 | $NHCH_3$ (4) | H | $OCH_3$ | $OCH_3$ |
| 32 | $N(C_2H_5)_2$ (4) | H | " | " |
| 33 | $N(CH_3)COCH_3$ (4) | H | " | H |
| 34 | $NHCOCH_3$ (3) | $CH_3$ (4) | " | $CH_3$ |
| 35 | $CF_3$ (2) | H | " | $OCH_3$ |

Further compounds of formula I which correspond to formula Ib,

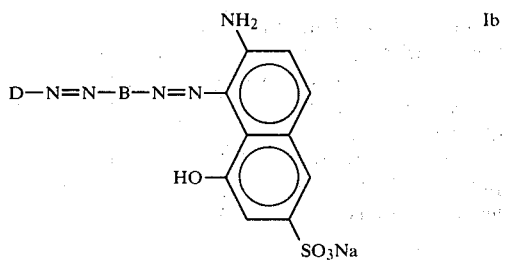

and which may be prepared in analogous manner to the procedure described in Example 1 are given in Table 2. The dyes of Examples 36–43 and 45–47 give dyeings of a dark blue shade on polyamide fibres and the dyestuff of Example 44 gives dyeings of violet shades on polyamide fibres. The dyeings obtained exhibit properties similar to those of the dyeings obtained with the compound of Example 1.

TABLE 2

| Example No. | D | B |
|---|---|---|
| 36 | $CH_3CONH$—⌬— | —⌬⌬ |
| 37 | ⌬—NHCOCH_3 | " |
| 38 | $CH_3CONH$—⌬— | —⌬⌬—H |
| 39 | ⌬—NHCOCH_3 | " |
| 40 | $CH_3$—⌬—NHCOCH_3 | —⌬⌬ |
| 41 | ⌬⌬— | —⌬—OCH_3 / CH_3 |
| 42 | " | —⌬—OCH_3 / OCH_3 |
| 43 | ⌬⌬— | —⌬—OCH_3 / CH_3 |
| 44 | " | —⌬— |
| 45 | ⌬—COOC_2H_5 | —⌬⌬ |
| 46 | ⌬—N(COCH_3)CH_3 | " |
| 47 | $CH_3CON(CH_3)$—⌬— | " |

In analogous manner to the procedure of Example 1 the corresponding 5-sulphonic acid derivatives of Examples 1–47 may be prepared by replacing the 2-amino-8-hydroxynaphthalene-6-sulphonic acid coupling component with 2-amino-8-hydroxynaphthalene-5-sulphonic acid.

APPLICATION EXAMPLE A 100 parts of pre-wetted nylon cloth (nylon 66) are entered at 40° into a dyebath consisting of 4000 parts of water, 10 parts of anhydrous sodium sulphate and 2 parts of the dyestuff Example 1.

The dye liquor is heated over the course of 30 minutes to boiling temperature, kept at this temperature for 1 hour, then 4 parts of glacial acetic acid are added thereto and dyeing is completed by heating for a further 30 minutes at boiling temperature. During dyeing, the water that evaporates is continuously replaced. The dark-blue dyed nylon cloth is then removed from the liquor, rinsed with water and dried. Wool may also be dyed by the same process.

Dyeings may be made in the same manner using the dyestuffs Examples 2–47, or mixtures thereof.

The dyeings have notable wet and light fastness.

APPLICATION EXAMPLE B

Polyamide is printed with a printing paste containing:
30 parts dyestuff of Example 7
50 parts urea
50 parts dissolving agent (e.g. thiodiethylene glycol)
290 parts water
500 parts suitable thickening agent (e.g. based on locust bean gum)
20 parts acid donating agent (e.g. ammonium tartrate)
60 parts thiourea The printed textile goods are steamed for 40 minutes at 102° (saturated steam), then rinsed with cold water, subsequently washed at 60° with a dilute solution of a conventional detergent and rinsed again with cold water. A dark-blue print having notable light and wet fastness is obtained.

In analogous manner printing pastes may be made employing the dyestuffs of Examples 1–6 or 8–47 or mixtures of dyestuffs of Examples 1–47; such pastes may be employed for printing in accordance with the above given procedure.

What is claimed is:

1. A compound of the formula

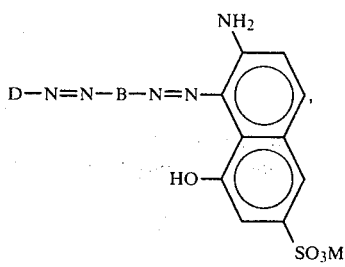

or a mixture of such compounds, wherein D is

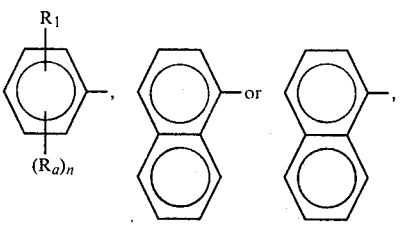

wherein $R_1$ is —$COOR_2$ or m— or p—$NR_5COR_6$, wherein
  $R_2$ is $C_{1-12}$alkyl,
  $R_5$ is hydrogen or $C_{1-4}$alkyl, and
  $R_6$ is $C_{1-6}$alkyl, $C_{1-6}$alkoxy or $C_{1-6}$alkyl monosubstituted by chloro or methoxy,
each
  $R_a$ is halo, $C_{1-4}$alkyl or $C_{1-4}$alkoxy and
  n is 0, 1 or 2,
  B is 1,4-naphthylene, 5,8-(1,2,3,4-tetrahydronaphthylene) or

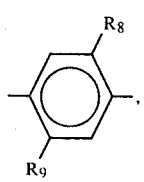

wherein
  each of $R_8$ and $R_9$ is independently hydrogen, $C_{1-4}$alkyl or $C_{1-4}$alkoxy, and
  M is hydrogen or a non-chromophoric cation.

2. A compound according to claim 1, or a mixture of such compounds, wherein D is

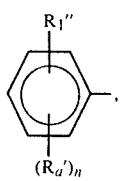

wherein $R_1''$ is —$COOR_2'$ or m— or p—$NR_5'CONR_6''$, wherein
  $R_2'$ is $C_{1-4}$alkyl,
  $R_5'$ is hydrogen or methyl, and
  $R_6''$ is methyl, ethyl, methoxy, 2-methoxyethyl or 3-methoxypropyl,
each
  $R_a'$ is chloro, methyl or methoxy, and
  n is 0, 1 or 2, and B is 1,4-naphthylene or

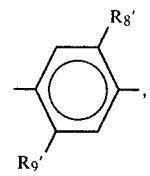

wherein
  $R_8'$ is methyl, methoxy or ethoxy, and
  $R_9'$ is hydrogen, methyl, methoxy or ethoxy.

3. A compound according to claim 2.

4. A compound according to claim 2, or a mixture of such compounds, wherein D is

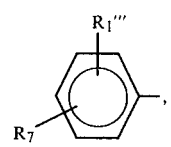

wherein $R_1'''$ is m- or p-$NR_5'COR_6'''$, wherein
  $R_5'$ is hydrogen or methyl, and
  $R_6'''$ is methyl or methoxy.

5. A compound according to claim 4.

6. A compound according to claim 4, or a mixture of such compounds, wherein
  $R_1'''$ is m- or p-$NHCOCH_3$,
  $R_7$ is hydrogen, and B is

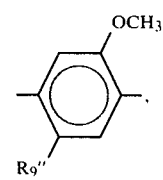

wherein $R_9''$ is methyl or methoxy.

7. A compound according to claim 1, or a mixture of such compounds, wherein B is

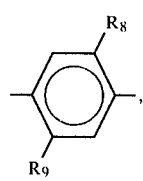

wherein each of $R_8$ and $R_9$ is independently hydrogen, $C_{1-4}$alkyl or $C_{1-4}$alkoxy.

8. A compound according to claim 1 having the formula

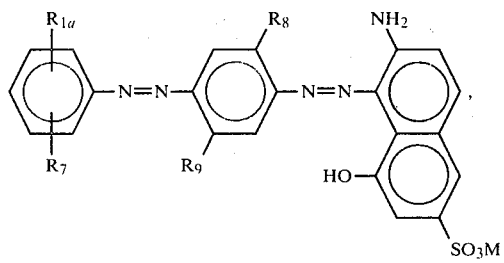

or a mixture of such compounds, wherein
$R_{1a}$ is —COOR$_2$' or m- or p-NR$_5$'COR$_6$',
wherein
$R_2$' is C$_{1-4}$alkyl,
$R_5$' is hydrogen or methyl, and
$R_6$' is C$_{1-4}$alkyl, C$_{1-4}$alkoxy, ω-chloro-(C$_{1-3}$alkyl) or ω-methoxy(C$_{1-3}$alkyl),
$R_7$ is hydrogen, chloro, methyl or methoxy,
each of $R_8$ and $R_9$ is independently hydrogen, C$_{1-4}$alkyl or C$_{1-4}$alkoxy, and
M is hydrogen or a non-chromophoric cation.

9. A compound according to claim 8.

10. A compound according to claim 8, or a mixture of such compounds, wherein M is hydrogen, an alkali metal cation or N$^\oplus$(R$_{10}$)$_4$,
wherein each $R_{10}$ is independently hydrogen, C$_{1-3}$alkyl or 2-, 3- or 4-C$_{2-4}$-hydroxyalkyl, with the proviso that at least one $R_{10}$ is hydrogen or C$_{1-3}$alkyl.

11. A compound according to claim 10, or a mixture of such compounds, wherein M is hydrogen or an alkali metal cation.

12. A compound according to claim 8, or a mixture of such compounds, wherein $R_{1a}$ is m- or p-NR$_5$'COR$_6$', wherein
$R_5$' is hydrogen or methyl, and
$R_6$' is C$_{1-4}$alkyl or C$_{1-4}$alkoxy,
$R_8$ is methoxy, and
$R_9$ is hydrogen, methyl or methoxy.

13. A compound according to claim 8, or a mixture of such compounds, wherein $R_6$' is C$_{1-4}$alkyl or C$_{1-4}$alkoxy.

14. A compound according to claim 13, or a mixture of such compounds, wherein $R_6$' is C$_{1-4}$alkyl.

15. A compound according to claim 8, or a mixture of such compounds, wherein $R_{1a}$ is m- or p—NR$_5$'COR$_6$', wherein
$R_5$' is hydrogen or methyl, and
$R_6$' is C$_{1-4}$alkyl, C$_{1-4}$alkoxy, ω-chloro-(C$_{1-3}$alkyl) or ω-methoxy(C$_{1-3}$alkyl).

16. A compound according to claim 15, or a mixture of such compounds, wherein $R_5$' is hydrogen.

17. A compound according to claim 15, or a mixture of such compounds, wherein $R_6$' is C$_{1-4}$alkyl or C$_{1-4}$alkoxy.

18. A compound according to claim 17, or a mixture of such compounds, wherein $R_6$' is C$_{1-4}$alkyl.

19. A compound according to claim 8, or a mixture of such compounds, wherein $R_7$ is hydrogen.

20. A compound according to claim 8, or a mixture of such compounds,
wherein
$R_8$ is methyl, methoxy or ethoxy, and
$R_9$ is hydrogen, methyl or methoxy.

21. A compound according to claim 20, or a mixture of such compounds, wherein $R_8$ is methoxy.

22. A compound according to claim 21 having the formula

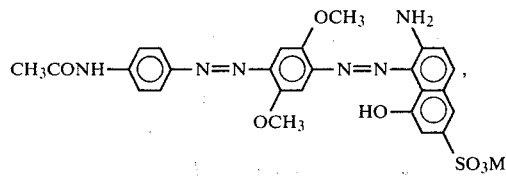

wherein M is hydrogen or a non-chromophoric cation.

23. The compound according to claim 22 wherein M is sodium.

24. A compound according to claim 21 having the formula

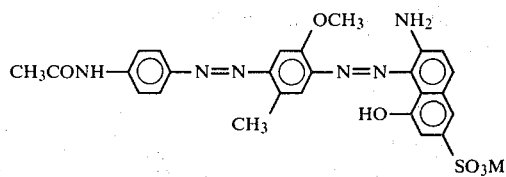

wherein M is hydrogen or a non-chromophoric cation.

25. The compound according to claim 9 wherein M is sodium.

26. A compound according to claim 21 having the formula

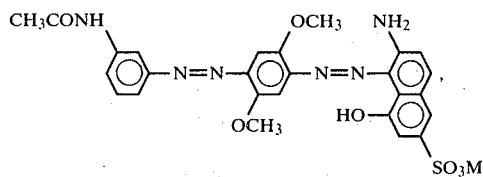

wherein M is hydrogen or a non-chromophoric cation.

27. The compound according to claim 24 wherein M is sodium.

28. A compound according to claim 21 having the formula

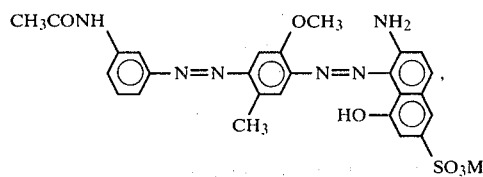

wherein M is hydrogen or a non-chromophoric cation.

29. The compound according to claim 28 wherein M is sodium.

30. A compound according to claim 21 having the formula

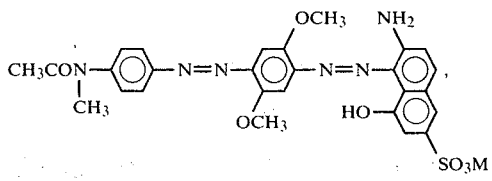

wherein M is hydrogen or a non-chromophoric cation.

31. The compound according to claim 30 wherein M is sodium.

32. A compound according to claim 21 having the formula

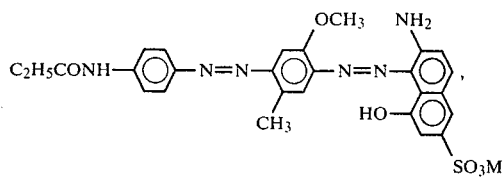

wherein M is hydrogen or a non-chromophoric cation.

33. The compound according to claim 32 wherein M is sodium.

34. A compound according to claim 21 having the formula

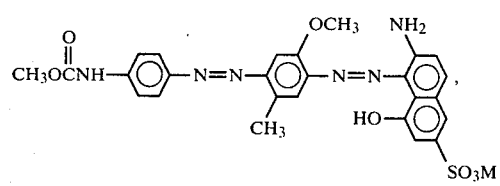

wherein M is hydrogen or a non-chromophoric cation.

35. The compound according to claim 34 wherein M is sodium.

36. A compound according to claim 21 having the formula

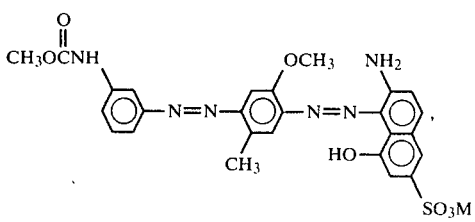

wherein M is hydrogen or a non-chromophoric cation.

37. The compound according to claim 36 wherein M is sodium.

38. A compound according to claim 21 having the formula

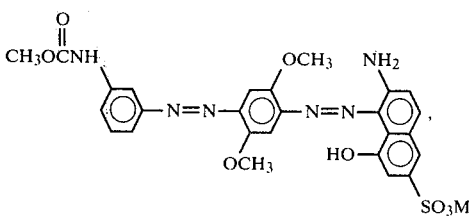

wherein M is hydrogen or a non-chromophoric cation.

39. The compound according to claim 38 wherein M is sodium.

40. A compound according to claim 20 having the formula

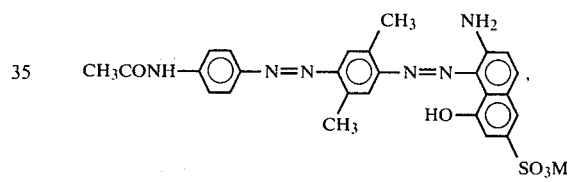

wherein M is hydrogen or a non-chromophoric cation.

41. The compound according to claim 40 wherein M is sodium.

* * * * *